United States Patent
Koo et al.

(10) Patent No.: US 8,820,540 B2
(45) Date of Patent: Sep. 2, 2014

(54) METHOD FOR PREPARING A FILTRATION MEMBRANE AND FILTRATION MEMBRANE PREPARED BY SAID METHOD

(75) Inventors: Ja-Young Koo, Billerica, MA (US); Doowon Lee, Daegu (KR); Sungpyo Hong, Kyungbuk (KR)

(73) Assignee: Woongjin Chemical Co., Ltd., Gyeongsangbuk-Do (KR)

( * ) Notice: Subject to any disclaimer, the term of this patent is extended or adjusted under 35 U.S.C. 154(b) by 730 days.

(21) Appl. No.: 12/931,304

(22) Filed: Jan. 28, 2011

(65) Prior Publication Data
US 2012/0193284 A1    Aug. 2, 2012

(51) Int. Cl.
| | |
|---|---|
| B01D 39/00 | (2006.01) |
| B01D 39/14 | (2006.01) |
| B01D 71/06 | (2006.01) |
| B01D 71/26 | (2006.01) |
| B29C 65/00 | (2006.01) |
| B29C 59/00 | (2006.01) |
| B28B 11/08 | (2006.01) |
| B01D 69/12 | (2006.01) |
| B01D 71/56 | (2006.01) |
| B01D 67/00 | (2006.01) |

(52) U.S. Cl.
CPC ............. B01D 69/12 (2013.01); B01D 71/56 (2013.01); *B01D 67/0086* (2013.01)
USPC ............. 210/490; 210/500.38; 210/500.41; 210/500.35; 210/500.39; 210/500.4; 264/293

(58) Field of Classification Search
CPC ...... B01D 69/12; B01D 61/002; B01D 71/56; B01D 2323/42; B01D 69/10; B01D 67/0032; B01D 71/50; B01D 2325/06; B01D 67/0086
USPC .............. 210/490, 500.38, 500.41, 500.36, 210/500.4, 500.39, 500.35; 264/45.1, 41, 264/293; 156/77
See application file for complete search history.

(56) References Cited

U.S. PATENT DOCUMENTS

| | | |
|---|---|---|
| 3,988,245 A | 10/1976 | Wang |
| 4,277,344 A | 7/1981 | Cadotte |
| 4,629,563 A | 12/1986 | Wrasidlo |

(Continued)

OTHER PUBLICATIONS

Loeb, "Large-scale power production by pressure-retarded osmosis, using river water and sea water passing through spiral modules," Desalination, 143:115-22 (2002).

(Continued)

*Primary Examiner* — Ana Fortuna
(74) *Attorney, Agent, or Firm* — Kriegsman & Kriegsman

(57) ABSTRACT

Method for preparing a filtration membrane and a filtration membrane prepared by the method. According to one embodiment, the method involves casting a polymer solution onto a porous support to form a coated support. The coated support is then quenched to form a membrane/support composite, and the membrane/support composite is then dried. Next, a first end of a first piece of adhesive tape is applied to the membrane side of the composite, and the second end of the first piece of adhesive tape is applied to a first rotatable winder. In addition, a first end of a second piece of adhesive tape is applied to the support side of the composite, and the second end of the second piece of adhesive tape is applied to a second rotatable winder. The two winders are then rotated so as to pull apart the membrane from the support.

42 Claims, 7 Drawing Sheets

(56) References Cited

U.S. PATENT DOCUMENTS

| | | | |
|---|---|---|---|
| 4,830,885 A | 5/1989 | Tran et al. | |
| 4,872,984 A | 10/1989 | Tomaschke | |
| 4,950,404 A | 8/1990 | Chau | |
| 4,983,291 A | 1/1991 | Chau et al. | |
| 5,576,057 A | 11/1996 | Hirose et al. | |
| 5,614,099 A | 3/1997 | Hirose et al. | |
| 5,843,351 A * | 12/1998 | Hirose et al. | 264/45.1 |
| 5,886,059 A | 3/1999 | Wang | |
| 6,015,495 A | 1/2000 | Koo et al. | |
| 6,063,278 A | 5/2000 | Koo et al. | |
| 6,245,234 B1 | 6/2001 | Koo et al. | |
| 8,181,794 B2 * | 5/2012 | McGinnis et al. | 210/500.38 |
| 8,460,554 B2 * | 6/2013 | McGinnis et al. | 210/652 |
| 2006/0180544 A1 * | 8/2006 | Kools | 210/490 |
| 2011/0073540 A1 * | 3/2011 | McGinnis et al. | 210/490 |
| 2012/0193284 A1 * | 8/2012 | Koo et al. | 210/500.21 |
| 2012/0234758 A1 * | 9/2012 | McGinnis et al. | 210/652 |

OTHER PUBLICATIONS

McCutcheon et al., "A novel ammonia-carbon dioxide forward (direct) osmosis desalination process," Desalination, 174:1-11 (2005).

Cath et al., "Forward osmosis: Principles, applications, and recent developments," Journal of Membrane Science, 281:70-87 (2006).

* cited by examiner

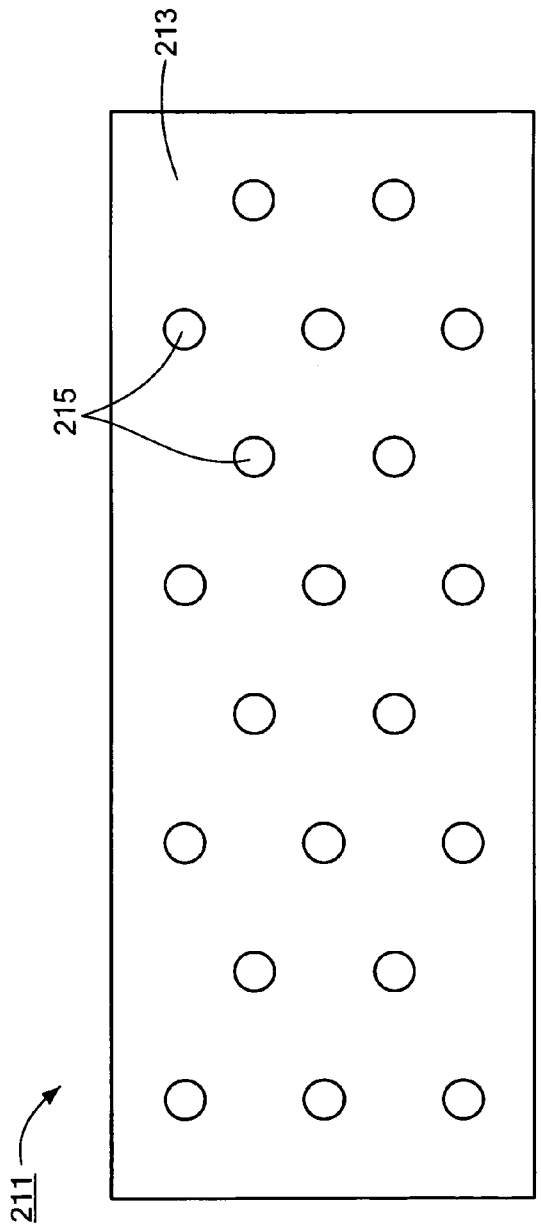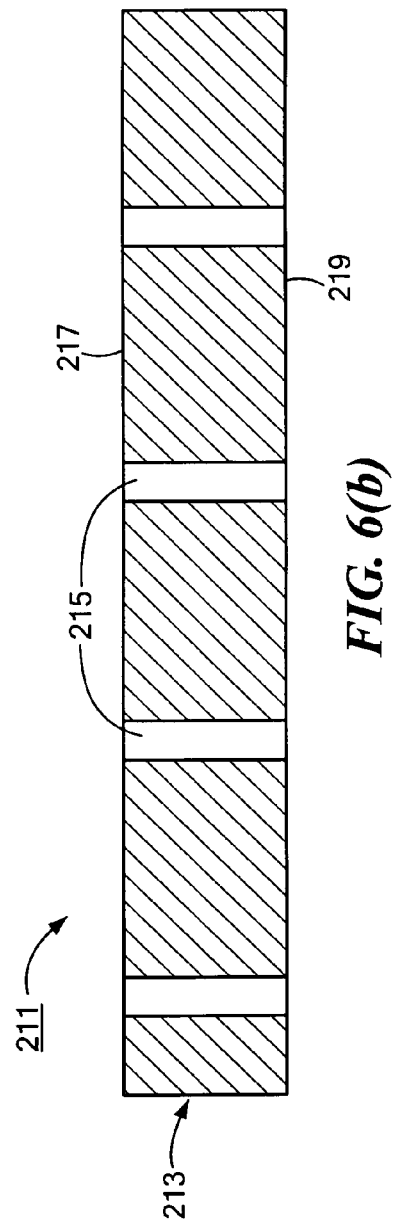

METHOD FOR PREPARING A FILTRATION MEMBRANE AND FILTRATION MEMBRANE PREPARED BY SAID METHOD

BACKGROUND OF THE INVENTION

The present invention relates generally to filtration membranes and to methods for preparing filtration membranes and relates more particularly to a novel method for preparing a filtration membrane and to a filtration membrane prepared by said method.

Filtration is a mechanical process used to separate solids from fluids using a porous medium, i.e., a filtration membrane, through which only the fluid and those particles smaller than the pores of the filtration membrane can pass. Consequently, depending on the pore size of filtration membrane, one can filter solids of a corresponding size. Various classes of filtration membranes exist, such classes including microfiltration membranes, ultrafiltration membranes, and reverse osmosis membranes. Microfiltration membranes are typically capable of filtering solids larger than about 0.05 microns, ultrafiltration membranes are typically capable of filtering solids larger than about 0.002 microns, and reverse osmosis membranes are typically capable of filtering solids larger than about 0.0006 microns.

Microfiltration membranes and ultrafiltration membranes are typically made by the same type of phase inversion process of a polymer solution, with either a microfiltration membrane or an ultrafiltration membrane being produced depending upon the type of polymer in the solution, the concentration of polymer in the solution, and the type of solvent in the solution. As seen, for example, in U.S. Pat. No. 3,988,245, inventor Wang, which issued Oct. 26, 1976; U.S. Pat. No. 4,629,563, inventor Wrasidlo, which issued Dec. 16, 1986; and U.S. Pat. No. 5,886,059, inventor Wang, which issued Mar. 23, 1999, all of which are incorporated herein by reference, the membrane preparation process typically comprises casting a polymer solution onto a support, quenching the coated support in a water bath to dissolve out the initial solvent and to form the porous membrane, and then drying the formed membrane.

Typically, membranes of the type described above are formed as part of a continuous manufacturing process in which, after the membrane material is dried, the membrane is wound into a roll for subsequent processing into various end-use structures, such as pleated cartridges, spiral-wound membranes, and plate-and-frame membranes. According to one approach, the support onto which the polymer solution is cast is made of a non-porous polymeric material, such as a polyethylene terephthalate (PET) film, or other non-porous materials like glass. One benefit to using a non-porous material as the support is that, after the formation of the membrane on the support, the support separates from the membrane, thereby facilitating the subsequent processing of the membrane into the various types of end-use structures described above. However, on the other hand, because the membrane, unaccompanied by the support, possesses poor tensile strength, the manufacturing process must be conducted slowly in order to permit the membrane to be wound into a roll without being torn. Consequently, the throughput for manufacturing ultrafiltration and microfiltration membranes using a non-porous material as the support tends to be lower than desired.

In view of the above, another approach to manufacturing ultrafiltration and microfiltration membranes has been to use a support made of a woven or non-woven fabric, typically made of PET fibers, instead of a non-porous support made of a polymeric film or the like. When the polymer solution is cast onto the aforementioned fabric, the solution tends to penetrates into the fabric to a certain extent, thereby resulting in a membrane that does not, thereafter, separate from the support. One benefit to the support remaining coupled to the membrane is that the winding of the membrane (with its attached support) into a roll can be performed under higher tension and at greater speeds than would be possible if the membrane were unaccompanied by the support. On the other hand, because the support remains coupled to the membrane, the thickness of the support/membrane composite is greater than the thickness of the membrane alone, and this increased thickness limits the ability of the membrane to be processed into end-use structures, such as pleated cartridges, having optimally high surface areas.

As noted above, in addition to microfiltration membranes and ultrafiltration membranes, reverse osmosis membranes represent another class of filtration membranes. One common type of reverse osmosis membrane is a composite membrane comprising a porous support and a thin polyamide film formed on the porous support. Typically, the porous support is an ultrafiltration membrane formed on PET fabric, and the thin polyamide film is formed by an interfacial polymerization of a polyfunctional amine and a polyfunctional acyl halide. Examples of composite polyamide reverse osmosis membranes are disclosed in the following patents, all of which are incorporated herein by reference: U.S. Pat. No. 4,277,344, inventor Cadotte, which issued Jul. 7, 1981; U.S. Pat. No. 4,872,984, inventor Tomaschke, which issued Oct. 10, 1989; U.S. Pat. No. 4,983,291, inventors Chau et al., which issued Jan. 8, 1991; U.S. Pat. No. 5,576,057, inventors Hirose et al., which issued Nov. 19, 1996; U.S. Pat. No. 5,614,099, inventors Hirose et al., which issued Mar. 25, 1997; U.S. Pat. No. 4,950,404, inventor Chau, which issued Aug. 21, 1990; U.S. Pat. No. 4,830,885, inventors Tran et al., which issued May 16, 1989; U.S. Pat. No. 6,245,234, inventors Koo et al., which issued Jun. 12, 2001; U.S. Pat. No. 6,063,278, inventors Koo et al., which issued May 16, 2000; and U.S. Pat. No. 6,015,495, inventors Koo et al., which issued Jan. 18, 2000.

As can be appreciated, because composite polyamide membranes of the type described above typically include, in addition to a thin polyamide layer, a fabric support secured to an ultrafiltration membrane, the types of shortcomings discussed above that result from the use of a fabric support are also applicable to these composite polyamide membranes.

Another use for composite polyamide membranes of the aforementioned type is in a process known as forward osmosis. Forward osmosis is a natural phenomenon in which water flows through a porous membrane from a volume of low solute concentration to a volume of high solute concentration. As such, forward osmosis is effectively the opposite of reverse osmosis, in which a volume of high solute concentration is placed under sufficient pressure to exceed the osmotic pressure and, thereby, to cause water to flow from a volume of high solute concentration to a volume of low solute concentration. One application of the principle of forward osmosis has been used in a process called pressure retarded osmosis, which, as explained in the following documents incorporated herein by reference, has been used to produce electricity from the osmotic power of sea water: Loeb, "Large-scale power production by pressure-retarded osmosis, using river water and sea water passing through spiral modules," *Desalination*, 143:115-22 (2002); McCutcheon et al., "A novel ammonia-carbon dioxide forward (direct) osmosis desalination process," *Desalination*, 174:1-11 (2005); and Cath et al., "Forward osmosis: Principles, applications, and recent developments," *Journal of Membrane Science*, 281:70-87 (2006).

In both reverse osmosis and forward osmosis, the thin polyamide layer faces the volume of high solute concentration, and the fabric support faces the volume of low solute concentration. In the case of reverse osmosis, whatever resistance the fabric support may provide to the flow of water from the volume of high solute concentration to the volume of low solute concentration is adequately overcome by the applied pressure. By contrast, in the case of forward osmosis, which relies solely on osmotic pressure to cause water to flow from the volume of low solute concentration to the volume of high solute concentration, the fabric support provides an undesirable resistance to water flow.

SUMMARY OF THE INVENTION

It is an object of the present invention to provide a novel method for preparing a filtration membrane.

It is another object of the present invention to provide a method as described above that overcomes at least some of the disadvantages associated with existing methods for preparing filtration membranes.

Therefore, according to one feature of the present invention, there is provided a method of preparing a filtration membrane, said method comprising the steps of (a) providing a porous support; (b) casting a polymer solution onto the porous support to form a coated support; (c) quenching the coated support to form a membrane/support composite; (d) drying the membrane/support composite; and (e) delaminating the membrane/support composite to form an unsupported filtration membrane.

According to another feature of the present invention, there is provided a method of preparing a filtration membrane, said method comprising the steps of (a) providing a porous support; (b) casting a polymer solution onto the porous support to form a coated support; (c) quenching the coated support to form a membrane/support composite; (d) forming a polyamide layer on the membrane/support composite to form a multi-layer membrane/support composite; (e) drying the multi-layer membrane/support composite; and (f) delaminating the multi-layer membrane/support composite to form an unsupported multi-layer filtration membrane.

According to still another feature of the present invention, there is provided a method of preparing a plurality of filtration membranes, said method comprising the steps of (a) providing a porous support; (b) forming a filtration membrane on the porous support, whereby a membrane/support composite is formed; (c) delaminating the membrane/support composite to provide an unsupported filtration membrane and a regenerated porous support; and (d) repeating steps (b) and (c) at least one time with the regenerated porous support.

The present invention is also directed at filtration membranes prepared according to the above method.

The present invention is additionally directed at a system for delaminating a membrane/support composite to form an unsupported filtration membrane.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts:

FIGS. 6(a) and 6(b) are top and section views, respectively, of an alternate embodiment of a porous support that may be used in the methods of FIGS. 1 and 4 (the porous support of FIGS. 6(a) and 6(b) not necessarily being drawn to scale);

DETAILED DESCRIPTION OF PREFERRED EMBODIMENTS

Figure 1:
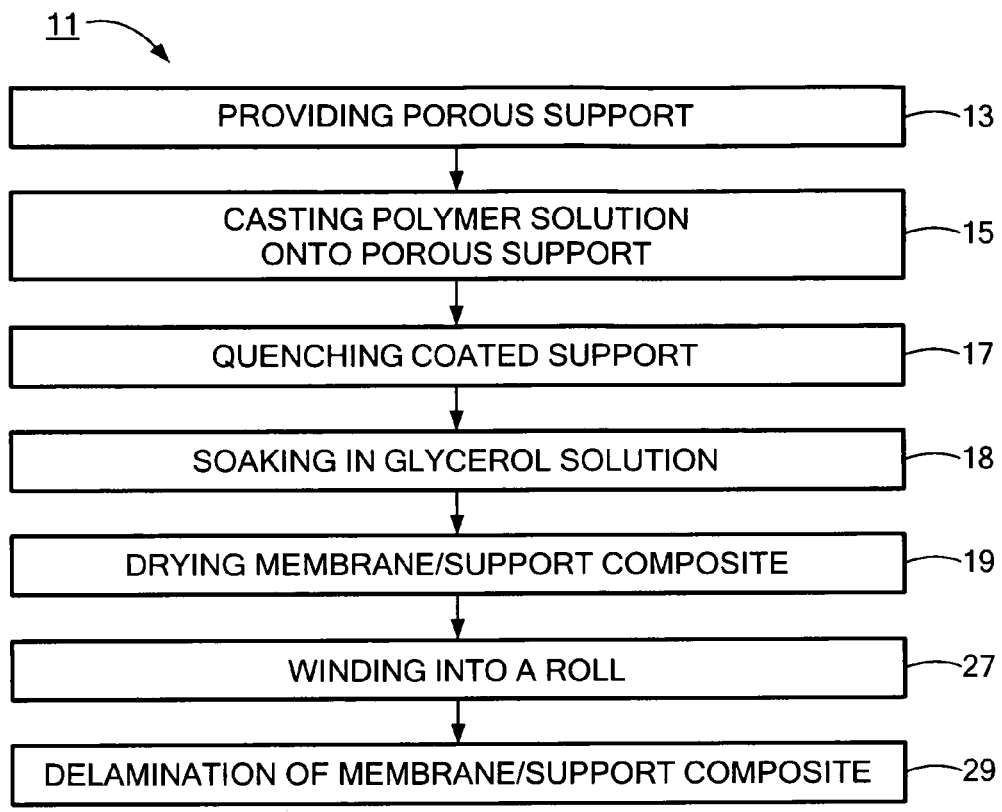
FIG. 1 is a flowchart, schematically depicting a first embodiment of a method for preparing a filtration membrane in accordance with the teachings of the present invention.

Referring now to FIG. 1, there is shown a flowchart, schematically depicting a first embodiment of a method for preparing a filtration membrane in accordance with the teachings of the present invention, said method being represented generally by reference numeral 11. Certain steps of method 11 that are not essential to an understanding of the present invention but that are known to those of ordinary skill in the art are not disclosed herein.

As can be seen, method 11 may begin in a step 13 with the provision of a porous support. According to one embodiment, the porous support may be a woven or non-woven fabric. The woven or non-woven fabric may be made in a conventional manner from a fibrous material, such as, but not limited to, polyethylene terephthalate (PET), polypropylene, Nylon (polyamide), and cellulose-based materials, such as cellulose acetate and rayon. Preferably, the woven or non-woven fabric has a thickness of about 50 to 200 µm, more preferably about 70 to 150 µm, and even more preferably about 80 to 130 µm.

Next, method 11 may continue in a step 15 with the casting of a polymer solution onto the top surface of the porous support. The polymer of the polymer solution may comprise any one or more polymers suitable for making an ultrafiltration or microfiltration membrane, such polymers including, but not being limited to, a polysulfone, a polyether sulfone, a polyimide, a polyamide, a polypropylene, and various halogenated polymers, such as polyvinylidene fluoride. The solvent of the polymer solution may be a single solvent or may be a mixture of solvents. The type of polymer, the concentration of the polymer, and the type of solvent used may be selected according to whether a microfiltration membrane or an ultrafiltration membrane is desired to be made.

For reasons to become apparent below, it is preferable that the polymer solution only penetrate the fabric support to a limited extent. More specifically, it is preferable that, where the fabric support has a thickness of less than 90 µm, the polymer solution should penetrate to a depth of no more than ¼ the thickness of the fabric support, and where the fabric support has a thickness of at least 90 µm, the polymer solution should penetrate to a depth of no more than about 25-30 µm.

The extent to which the polymer solution penetrates into the fabric support depends principally on the viscosity of the polymer solution and the air-permeability of the fabric. Generally speaking, the viscosity of the polymer solution can vary anywhere from about 400 to 10,000 cP (centipoise). To ensure that the solution will not penetrate too deeply into the fabric, where the viscosity of the polymer solution is comparatively low, the air-permeability of the fabric should be comparatively low and vice versa. For example, a polymer solution with a viscosity of 900 cP can be cast on a fabric having an air-permeability of 0.73 $cm^3/cm^2 \cdot s$ without penetrating too deeply, and a polymer solution with a viscosity of 3,000 cP can be cast on a fabric having an air-permeability of 7.5 $cm^3/cm^2 \cdot s$ without penetrating too deeply.

The technique used to cast the polymer solution onto the porous support may be conventional.

Next, method 11 may continue in a step 17 with the quenching of the coated support in a water bath, said quenching resulting in the formation of a membrane securely coupled to the fabric support. The technique for quenching the coated support in a water bath may be conventional. As noted above, depending on the type of polymer in the solution, the concentration of polymer in the solution, and the type of solvent in the solution, the membrane formed on the fabric support may be either a microfiltration membrane or an ultrafiltration membrane.

Next, method 11 may continue in a step 18 with the soaking of the membrane/support composite in about 10% aqueous solution of glycerol. The technique for soaking the membrane/support may be conventional.

Next, method 11 may continue in a step 19 with the drying of the membrane/support composite. The technique for drying the membrane/support composite may be conventional.

Figure 2:
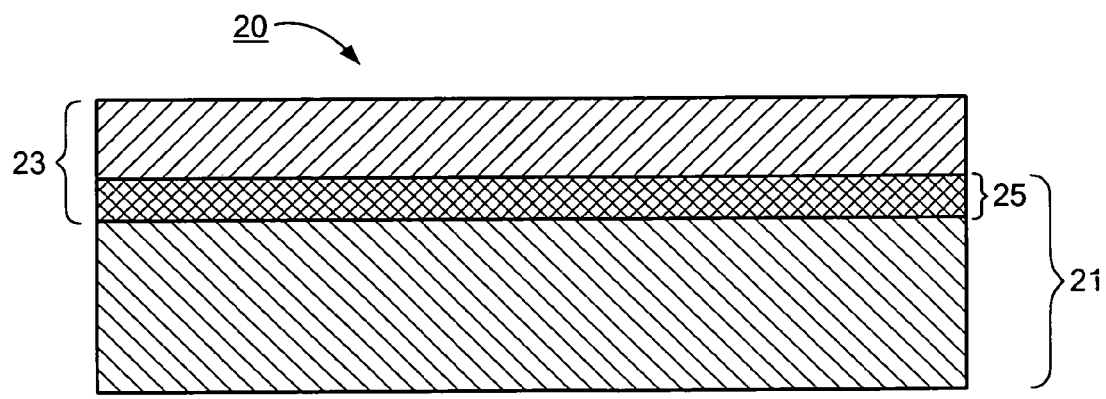
FIG. 2 is a simplified section view of the membrane/support composite formed according to the method of FIG. 1 as it appears after the drying step and before the winding and delamination steps (the membrane/support composite not necessarily being drawn to scale)

Referring now to FIG. 2, there is shown a simplified section view of the membrane/support composite that is formed after drying step 19, said membrane/support composite being represented generally by reference numeral 20. As can be seen, membrane/support composite 20 comprises a porous support 21 and a membrane 23. Membrane 23, which may have a thickness of about 20 to 60 µm, preferably penetrates porous support 21 in a region 25 to the extent described above; as a result of this penetration, membrane 23 is bonded to porous support 21.

Referring back now to FIG. 1, method 11 may continue in a step 27 with the winding of membrane/support composite 20 into a roll. The technique for winding membrane/support composite 20 into a roll may be conventional. Because of the tensile strength provided to composite 20 by porous support 21, winding step 27 may be performed under higher tension and at a greater speed than would otherwise be possible without porous support 21.

Figure 3A:
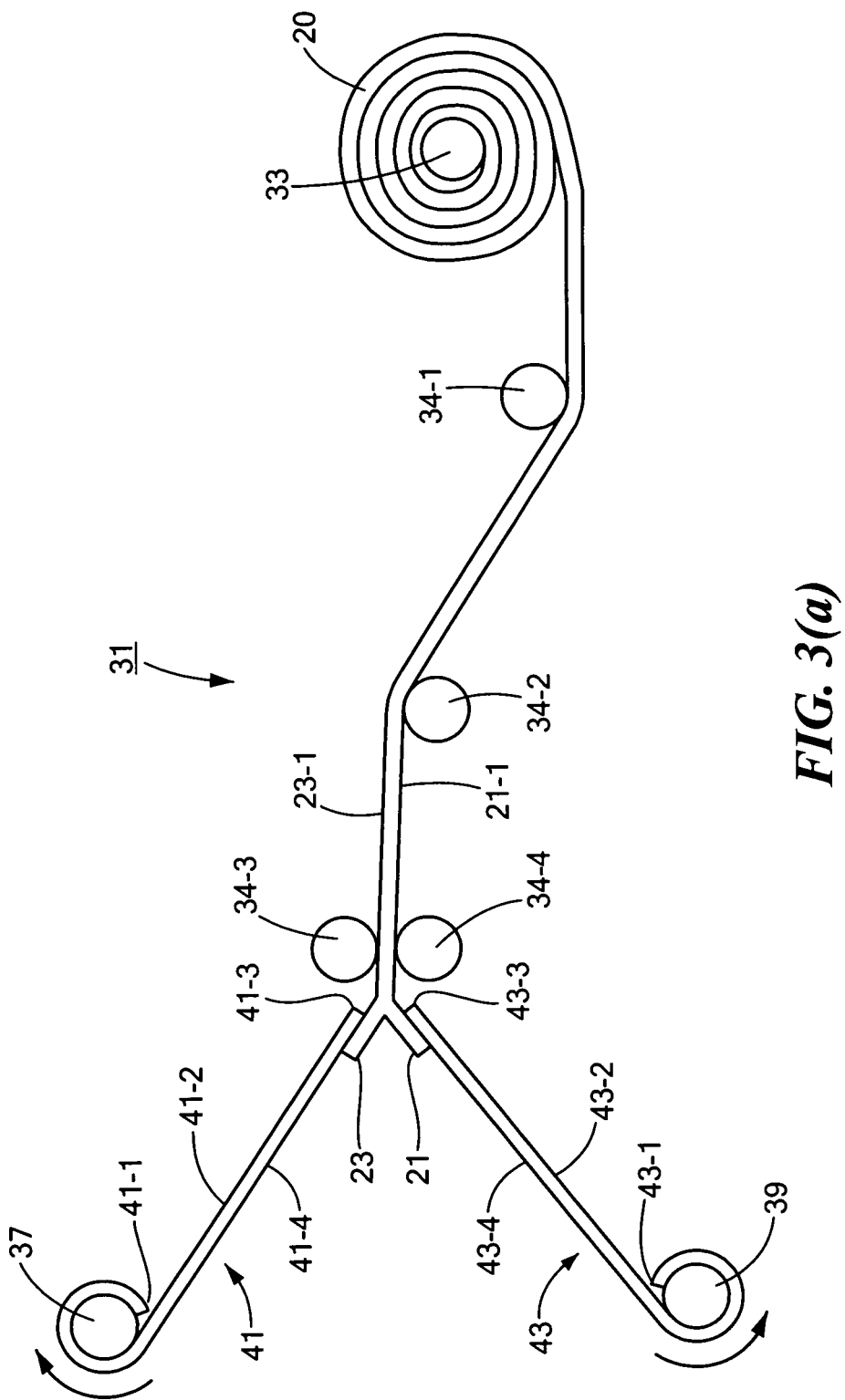
FIG. 3(a) is a simplified side view of a first embodiment of a system for delaminating the membrane/support composite shown in FIG. 2 (the membrane/support composite not necessarily being drawn to scale)

Next, method 11 may continue in a step 29 with the delamination of membrane/support composite 20. Referring now to FIG. 3(a), there is shown a first embodiment of a simplified system for delaminating membrane/support composite 20, said delaminating system being represented generally by reference numeral 31. As can be seen, system 31 may comprise an unwinder 33 on which is mounted membrane/support composite 20 in roll form. System 31 may also comprise a plurality of guide rollers 34-1, 34-2, 34-3 and 34-4, which may be used to guide membrane/support composite 20 on a desired path away from unwinder 33. System 31 may further comprise a pair of rotatably-driven winders 37 and 39, with winder 37 being positioned above the space between rollers 34-3 and 34-4 and with winder 39 being positioned below the space between rollers 34-3 and 34-4. A first piece of double-sided adhesive tape 41 is secured at a first end 41-1 by its top face 41-2 to winder 37 and is secured at a second end 41-3 by its bottom face 41-4 to the leading end of membrane 23 along a top surface 23-1. A second piece of double-sided adhesive tape 43 is secured at a first end 43-1 by its bottom face 43-2 to winder 39 and is secured at a second end 43-3 by its top face 43-4 to the leading end of support 21 along its bottom surface 21-1. Adhesive tapes 41 and 43 may be conventional in nature and are sufficiently adhesive so that, as winders 37 and 39 are rotated in the fashion shown, membrane 23 delaminates from support 21, with membrane 23 being wound into a roll on winder 37 and with support 21 being wound into a roll on winder 39. Adhesive tapes 41 and 43 may be as wide as support 21 and membrane 23 but need not be.

In use, the leading end of membrane/support composite 20 may be unwound from unwinder 33, then drawn across guide rollers 34-1 and 34-2, and then drawn between rollers 34-3 and 34-4. Adhesive tapes 41 and 43 may be partially unwound from winders 37 and 39, respectively, and then second end 41-3 of tape 41 may be secured to the top surface 23-1 of membrane 23, and second end 43-3 of tape 43 may be secured to the bottom surface 21-1 of support 21. Winders 37 and 39 may then be rotated as shown in FIG. 3(a), slowly at first as membrane 23 begins to be wound around winder 37 and then faster thereafter. (If desired, prior to attaching second end 41-3 of tape 41 to top surface 23-1 of membrane 23 and prior to attaching second end 43-3 of tape 43 to bottom surface 21-1 of support 21, one may manually peel apart the respective leading ends of membrane 23 and support 21 to facilitate the above-described tape-assisted delamination.)

The net result of using system 31 in the fashion described above is that tape 41 and then membrane 23 become wound into a roll on winder 37 and that tape 43 and then support 21 become wound into a roll on winder 39. As can readily be appreciated, if membrane 23 is permitted to penetrate too deeply into support 21, the delamination of membrane 23 from support 21 in the above manner may not be possible without causing undesired damage to membrane 23.

With membrane 23 thus wound into a roll on winder 37, membrane 23 may be subsequently processed into any of various end-use structures, conventional or otherwise, such structures including, but not limited to, pleated cartridges, spiral-wound membranes, and plate-and-frame membranes. Because the membrane of such end-use structures is not accompanied by a support, it can, for example, be more easily pleated into pleated cartridges, and the resulting end-use structures typically have greater surface area than would be the case if a support were present. This increase in surface area is highly desirable.

Figure 3B:
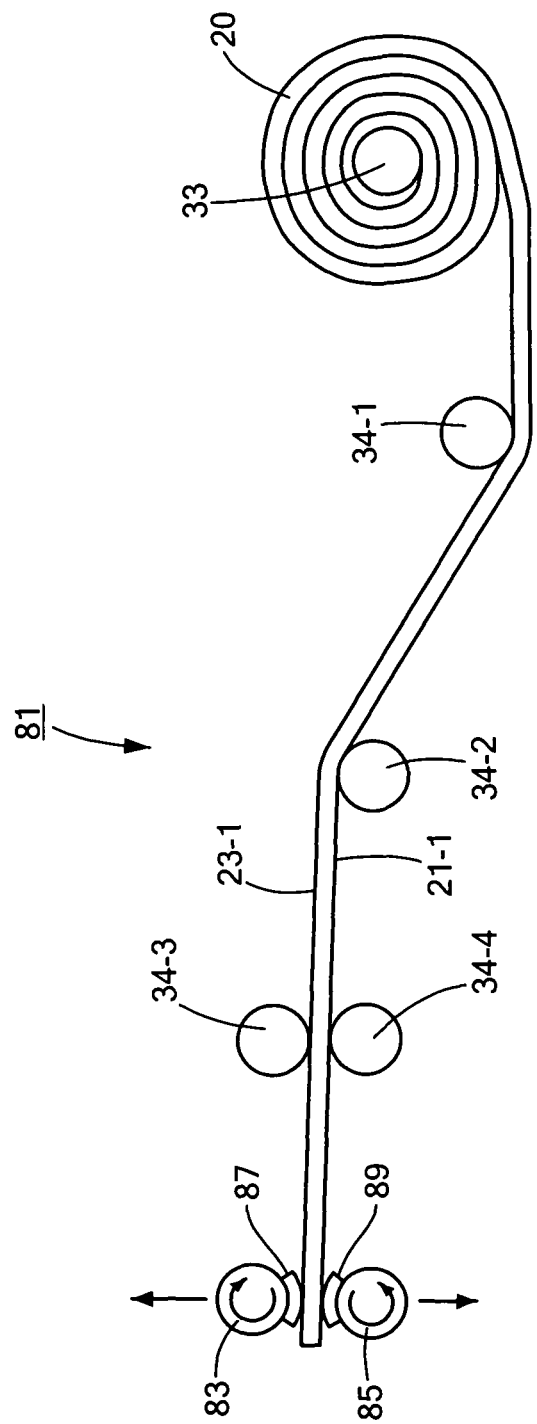
FIG. 3(b) is a simplified side view of a second embodiment of a system for delaminating the membrane/support composite shown in FIG. 2 (the membrane/support composite not necessarily being drawn to scale)

A second embodiment of a simplified system for delaminating membrane/support composite 20 is shown in FIG. 3(b), said system being represented generally by reference numeral 81. System 81 is similar in most respects to system 31, the principal difference between the two systems being that, whereas system 31 includes a pair of winders 37 and 39 and a pair of double-sided adhesive tapes 41 and 43, system 81 includes a pair of winders 83 and 85 and a pair of double-sided adhesive tapes 87 and 89. Tape 87 is used to adhere winder 83 to the top surface 23-1 of membrane 23, and tape 89 is used to adhere winder 85 to the bottom surface 21-1 of support 21. Winders 83 and 85 are not only rotatable in the directions shown but are also simultaneously translationally movable in the directions shown. In this manner, as winders 83 and 85 are moved translationally away from one another and are rotated, membrane 23 and support 21 are pulled apart from one another, with membrane 23 becoming wound into a roll on winder 83 and with support 21 becoming wound into a roll on winder 85. As can be appreciated, because winders 83 and 85 are initially positioned close to one another, tapes 87 and 89 may be considerably shorter than tapes 41 and 43. (If desired, prior to attaching tape 87 to top surface 23-1 of membrane 23 and prior to attaching tape 89 to bottom surface 21-1 of support 21, one may manually peel apart the respective leading ends of membrane 23 and support 21 to facilitate the above-described tape-assisted delamination.)

Figure 4:
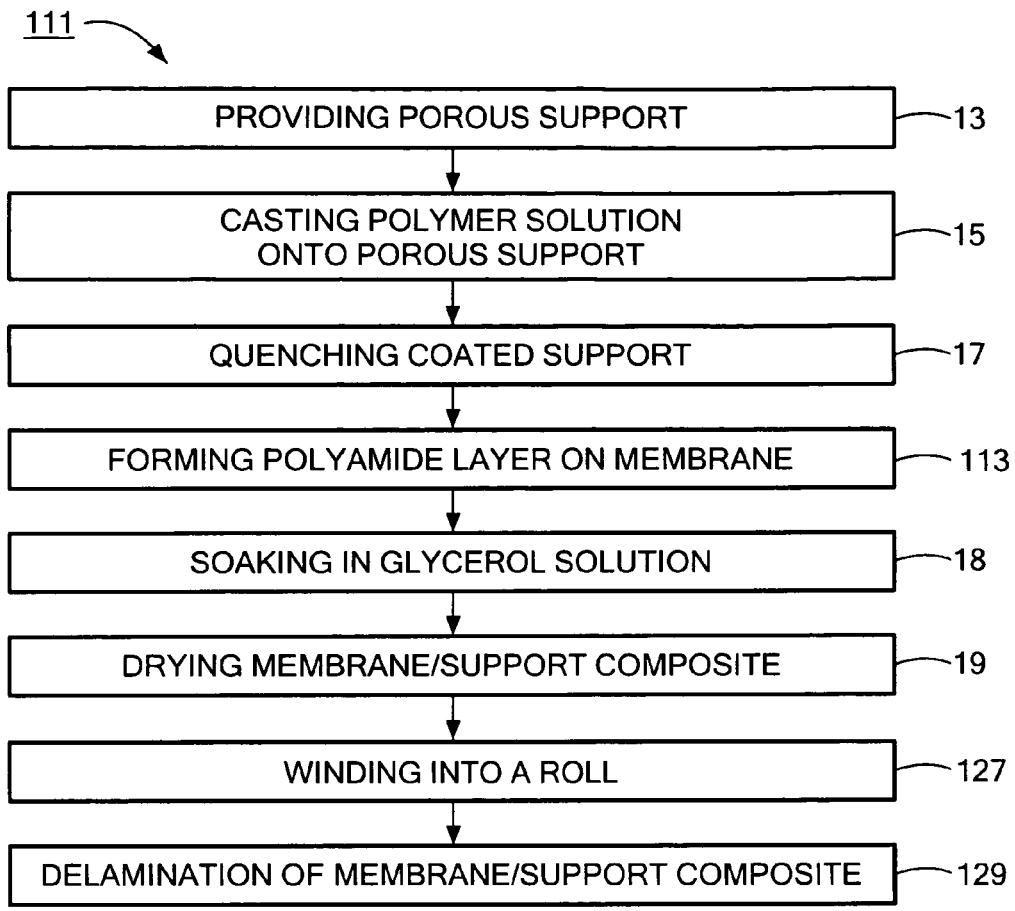
FIG. 4 is a flowchart, schematically depicting a second embodiment of a method for preparing a filtration membrane in accordance with the teachings of the present invention.

Referring now to FIG. 4, there is shown a flowchart, schematically depicting a second embodiment of a method for preparing a filtration membrane in accordance with the teachings of the present invention, said method being represented generally by reference numeral 111. Certain steps of method 111 that are not essential to an understanding of the present invention but that are known to those of ordinary skill in the art are not disclosed herein.

Method 111 is similar in many respects to method 11, the principal difference between the two methods being that method 111 additionally includes a step 113 of forming a polyamide layer on the exposed surface of membrane 23 (membrane 23 preferably being in the form of an ultrafiltration membrane) to form a two-layer or composite membrane on support 21. The technique for forming the aforementioned polyamide layer may be conventional and may comprise, for example, an interfacial polymerization of a polyfunctional amine and a polyfunctional acyl halide.

Figure 5:
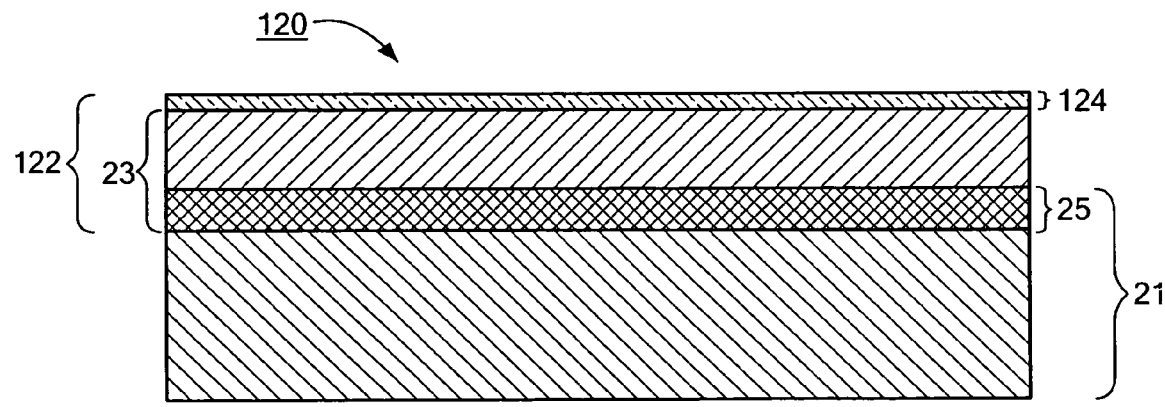
FIG. 5 is a simplified section view of the membrane/support composite formed according to the method of FIG. 4 as it appears after the polyamide layer forming step and before the winding and delamination steps (the membrane/support composite not necessarily being drawn to scale)

Referring now to FIG. 5, there is shown a simplified section view of the membrane/support composite that is formed after step 113, said membrane/support composite being represented generally by reference numeral 120. As can be seen, membrane/support composite 120 comprises a porous support 21 and a composite membrane 122, composite membrane 122 comprising membrane 23 and a polyamide layer 124. Membrane 23, which may have a thickness of about 20 to 60 μm, preferably penetrates porous support 21 in a region 25 to the extent described above; as a result of this penetration, membrane 23 is bonded to porous support 21. Polyamide layer 124, which may have a thickness of about 0.2 to 0.6 μm, is bonded to the top surface of membrane 23.

Referring back now to FIG. 4, method 111 may continue in a step 127 with the winding of membrane/support composite 120 into a roll after a soaking step 18 of soaking in about 3% glycerol aqueous solution and a drying step 19. The technique for winding membrane/support composite 120 into a roll may be conventional. After step 127, method 111 may continue in a step 129 with the delamination of composite membrane 122 from support composite 21. Delamination step 129 may be performed using, for example, system 31 in a fashion similar to that described above for membrane/support composite 20, the principal difference being that tape 41 is secured to the top surface of polyamide layer 124, instead of to the top surface of membrane 23. The result of performing delamination step 129 is that tape 41 and then composite membrane 122 become wound on winder 37 and that tape 43 and then support 21 become wound on winder 39.

With composite membrane 122 thus wound into a roll on winder 37, membrane 122 may be subsequently processed into any of various end-use structures, conventional or otherwise, such structures including, but not limited to, pleated cartridges, spiral-wound membranes, and plate-and-frame membranes. Because the membrane of such end-use structures is not accompanied by a support, it can, for example, be more easily pleated into pleated cartridges, and the resulting end-use structures typically have greater surface area than would be the case if a support were present. This increased surface area is highly desirable. Moreover, because no support is coupled to the membrane, the membrane may be useful in applications like forward osmosis, where the fabric support conventionally coupled to the membrane provides an undesirable resistance to water flow.

As can readily be appreciated, instead of using system 31 to perform delaminating step 129, system 81 may be used.

Referring now to FIGS. 6(a) and 6(b), there are shown top and section views, respectively, of an alternate embodiment of a porous support that may be used in either of methods 11 and 111, the porous support being represented generally by reference numeral 211.

Porous support 211 may comprise a sheet of material 213, which may be, for example, a polymeric film, such as a PET film, a polypropylene film, a polyethylene film, an acrylic film, a Nylon (polyamide) film, a polyimide film, and a polycarbonate film. A plurality of transverse openings 215, which may be made by needle-punching or another suitable process, such as laser punching or electron punching, may be provided in material 213, openings 215 extending completely from a top surface 217 of material 213 to a bottom surface 219 of material 213. Except for the presence of transverse openings 215, material 213 may be non-porous. Transverse openings 215 may have a diameter of about 0.01 to 5 mm and may be spaced apart from one another by about 0.05 to 100 mm. Where, for example, material 213 is a polymeric film, material 213 may have a thickness of about 0.1-1.0 mm.

Figure 7:
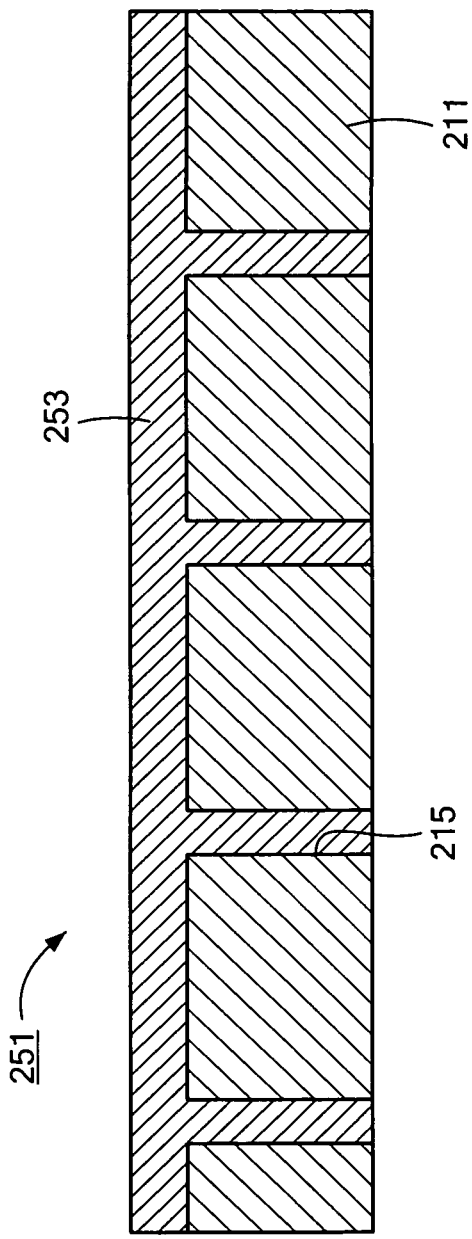
FIG. 7 is a section view of a first embodiment of a membrane/support composite formed using the porous support of FIGS. 6(a) and 6(b) (the membrane/support composite of FIG. 7 not necessarily being drawn to scale)

Referring now to FIG. 7, there is shown a section view of one embodiment of a membrane/support composite that may be formed using porous support 211 in method 11, the membrane/support composite being represented generally by reference numeral 251.

Composite 251 comprises support 211. In addition, composite 251 may further comprise a membrane 253 coupled to support 211. Membrane 253 may be formed by casting a suitable polymer solution onto the top surface of support 211 as in step 15 of method 11, then quenching the coated support as in step 17 of method 11, and then drying the membrane as in step 19 of method 11. Preferably, the viscosity of the polymer solution cast onto support 211 and the hole diameter of openings 215 are selected so that the flow of the polymer solution through openings 215 is not so great as to cause the membrane to form over much of the bottom surface of support 211, as well as over the entire top surface of support 211, since such a structure will make delamination considerably more difficult.

Figure 8:
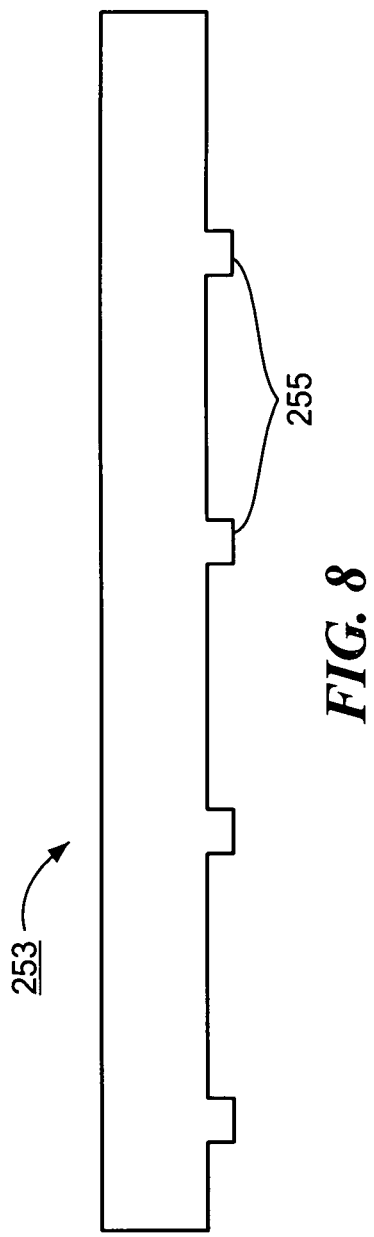
FIG. 8 is a side view of the delaminated membrane from the membrane/support composite of FIG. 7 (the delaminated membrane not necessarily being drawn to scale)

Using system 31 or system 81, support 211 and membrane 253 may be delaminated from one another. As seen best in FIG. 8, as a result of the delamination process, membrane 253 is provided with a plurality of protrusions 255 where the bottom of membrane 253 was previously situated in openings 215 of support 211. This pattern of protrusions 255 corresponds to the arrangement of openings 215 in support 211 and can be observed, for example, with an optical microscope.

Figure 9:
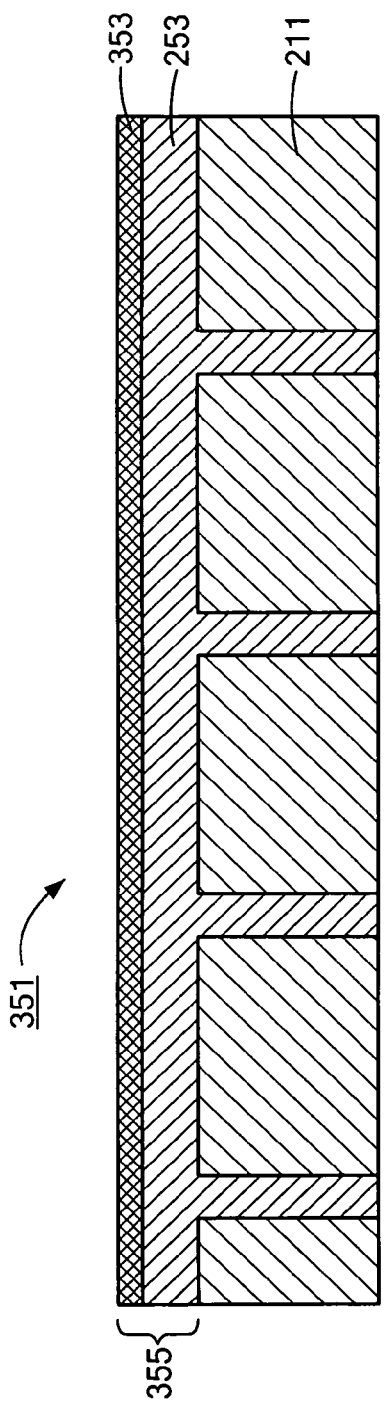
FIG. 9 is a section view of a second embodiment of a membrane/support composite formed using the porous support of FIGS. 6(a) and 6(b) (the membrane/support composite of FIG. 9 not necessarily being drawn to scale)

Referring now to FIG. 9, there is shown a section view of one embodiment of a membrane/support composite that may be formed using porous support 211 in method 111, the membrane/support composite being represented generally by reference numeral 351.

Figure 10:
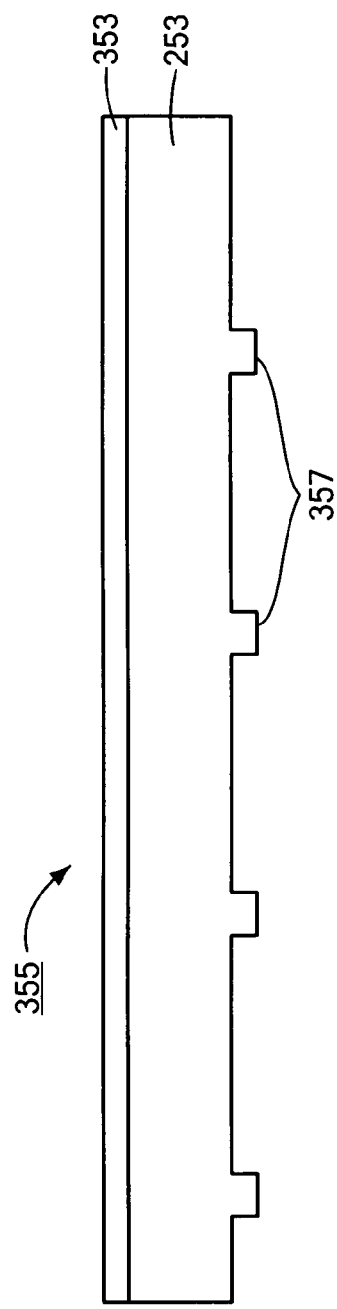
FIG. 10 is a side view of the delaminated membrane from the membrane/support composite of FIG. 9 (the delaminated membrane not necessarily being drawn to scale).

Composite 351 is similar in most respects to composite 251, the principal difference between the two composites being that composite 351 additionally comprises a polyamide layer 353, which may be formed, for example, by step 113 of method 111. Using system 31 or system 81, composite 351 may be delaminated to produce a composite membrane 355 (comprising polyamide layer 353 and membrane 253) and support 211. As seen best in FIG. 10, composite membrane 355 is provided with a plurality of protrusions 357 where the bottom of membrane 253 was previously situated in openings 215 of support 211. Protrusions 357, which correspond to the pattern of openings 215 in support 211 and which may be observed, for example, using an optical microscope, may be advantageous in serving as water flow channels and turbulence generators. Such physical features may be highly desirable where membrane 355 is used for reverse osmosis and, in particular, for forward osmosis and pressure retarded osmosis.

As can be appreciated, after delaminating the membrane from its associated porous support in accordance with teachings of the present invention, the porous support may be recycled and reused.

The following examples are illustrative only and do not in any way limit the present invention:

EXAMPLE 1

A 17.6% polysulfone solution in dimethylformamide (DMF) having a viscosity of 920 cP was cast on a PET non-woven fabric (100 μm thick) with an air-permeability of 0.73 cm$^3$/cm$^2$·s using a doctor knife with a gap of 160 μm. The polymer solution on the fabric was quenched in water. The resulting membrane (an ultrafiltration membrane) was rinsed in water, soaked in 10% glycerol, and dried at 60° C. for 5 minutes. The thickness of the composite membrane was about 140 μm. The membrane was then delaminated using a delaminating system of the type shown in FIG. 3(a). The flux and the rejection of 0.1% polyethylene oxide (MW 100,000) in water were then measured using a cross-flow flat sheet test system and also pleated module testing system at 1 bar (14.5 psi). The polyethylene oxide (PEO) content in the permeate water was analyzed by HPLC. The results are shown in Table 1.

TABLE 1

| Membrane Composition | Flux (gfd) | PEO Rejection Rate (%) |
|---|---|---|
| Composite Membrane Before Delamination | 213 | 87.2 |
| Delaminated Membrane | 205 | 89.6 |
| Pleated Module from Delaminated Membrane | 212 | 87.9 |

These results show that the PEO rejection and the flux did not change due to delamination, indicating that no damage to the membrane occurred as a result of the delamination process.

EXAMPLE 2

The above composite membrane from Example 1 as a support was soaked in an aqueous solution containing 2 wt % of meta-phenylenediamine (MPD) and 0.2% 2-ethyl-1,3-hexanediol for 40 seconds. The support was drained and nip-rolled to remove the excess aqueous solution. Then, the coated support was dipped in 0.1% solution of trimesoyl chloride (TMC) in Isopar® solvent (Exxon Corp.) for 1 minute followed by draining the excess organic solution off the support. The resulting reverse osmosis (RO) composite membrane was air-dried for about 2 minutes and then rinsed in 0.2% Na$_2$CO$_3$ aqueous solution for about 30 minutes at room temperature. After soaking in about 3% glycerol solution and drying, the membrane was delaminated using a delaminating system of the type shown in FIG. 3(a). The flux and the rejection of 0.2% NaCl in water were measured using a cross-flow flat sheet test system at 225 psi. The salt rejection was calculated by comparing the conductivity of the permeate water to the feed water. The results are shown in Table 2.

| Membrane Composition | Flux (gfd) | Salt Rejection Rate (%) |
|---|---|---|
| Composite RO Membrane | 23.9 | 98.6 |
| Delaminated RO Membrane | 24.0 | 98.5 |

The results show that the flux and salt rejection did not change before and after delamination, indicating no damage to the membrane occurred during the delamination process.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of preparing a filtration membrane, said method comprising the steps of:
   (a) providing a porous support;
   (b) casting a polymer solution onto the porous support to form a coated support;
   (c) quenching the coated support to form a membrane/support composite;
   (d) drying the membrane/support composite; and
   (e) delaminating the membrane/support composite to form an unsupported filtration membrane, wherein the membrane/support composite has a membrane side and a support side and wherein said delaminating step comprises applying a first piece of adhesive tape to the membrane side of the membrane/support composite, applying a second piece of adhesive tape to the support side of the membrane/support composite, and then pulling the first and second pieces of adhesive tapes away from one another to separate the membrane side of the membrane/support composite from the support side of the membrane/support composite.

2. The method as claimed in claim 1 wherein the first piece of adhesive tape has a first end and a second end and wherein the second piece of adhesive tape has a first end and a second end, wherein the first end of the first piece of adhesive tape is applied to the membrane side of the membrane/support composite, and the second end of the first piece of adhesive tape is applied to a first rotatable winder, wherein the first end of the second piece of adhesive tape is applied to the support side of the membrane/support composite, and the second end of the second piece of adhesive tape is applied to a second rotatable winder, and wherein said pulling is achieved by appropriately rotating said first and second rotatable winders.

3. The method as claimed in claim 1 wherein said porous support comprises a piece of fabric.

4. The method as claimed in claim 3 wherein said fabric is woven.

5. The method as claimed in claim 3 wherein said fabric is non-woven.

6. The method as claimed in claim 5 wherein said fabric is non-woven polyethylene terephthalate.

7. The method as claimed in claim 3 wherein said fabric is made from a material selected from the group consisting of polyethylene terephthalate, polypropylene, polyamide, and cellulose-based materials.

8. The method as claimed in claim 3 wherein said fabric has a thickness of about 50 to 200 µm.

9. The method as claimed in claim 8 wherein said fabric has a thickness of about 80 to 130 µm.

10. The method as claimed in claim 1 wherein said polymer solution comprises at least one polymer selected from the group consisting of a polysulfone, a polyether sulfone, a polyimide, a polyamide, a polypropylene, and a halogenated polymer.

11. The method as claimed in claim 1 wherein said porous support is a fabric support having a thickness of less than 90 µm and wherein said coated support comprises no more than ¼ the thickness of the fabric support penetrated by said polymer solution.

12. The method as claimed in claim 1 wherein said porous support is a fabric support having a thickness of at least 90 µm and wherein said coated support comprises no more than about 25-30 µm of the fabric support penetrated by said polymer solution.

13. The method as claimed in claim 1 wherein said unsupported filtration membrane is a microfiltration membrane.

14. The method as claimed in clam 1 wherein said unsupported filtration membrane is an ultrafiltration membrane.

15. A method of preparing a filtration membrane, said method comprising the steps of:
(a) providing a porous support, wherein said porous support comprises a polymeric film having a plurality of openings extending in a straight fashion from a top surface of the film to a bottom surface of the film;
(b) casting a polymer solution onto the porous support, with the solution penetrating the opening to form a coated support;
(c) quenching the coated support to form a membrane/support composite;
(d) drying the membrane/support composite; and
(e) delaminating the membrane/support composite to form an unsupported filtration membrane.

16. The method as claimed in claim 15 wherein said polymeric film is selected from the group consisting of a polyethylene terephthalate film, a polypropylene film, a polyethylene film, a polyamide film, a polyimide film, an acrylic film, and a polycarbonate film.

17. The method as claimed in claim 15 wherein said openings are formed by at least one of needle-punching a non-porous polymeric film, laser punching a non-porous polymeric film, and electron punching a non-porous polymeric film.

18. The method as claimed in claim 15 wherein said openings have a diameter of about 0.01 to 5 mm and are spaced apart from one another by about 0.05 to 100 mm.

19. The method as claimed in claim 15 wherein said polymeric film has a thickness of about 0.1-1.0 mm.

20. A filtration membrane made by the method of claim 15, wherein the filtration membrane has a plurality of protrusions where the polymeric solution penetrated the openings of the porous support.

21. A method of preparing a filtration membrane, said method comprising the steps of:
(a) providing a porous support;
(b) casting a polymer solution onto the porous support to form a coated support;
(c) quenching the coated support to form a membrane/support composite;
(d) forming a polyamide layer on the membrane/support composite to form a multi-layer membrane/support composite;
(e) drying the multi-layer membrane/support composite; and
(f) delaminating the multi-layer membrane/support composite to form an unsupported multi-layer filtration membrane, wherein the multi-layer membrane/support composite has a membrane side and a support side and wherein said delaminating step comprises applying a first piece of adhesive tape to the membrane side of the multi-layer membrane/support composite, applying a second piece of adhesive tape to the support side of the multi-layer membrane/support composite, and then pulling the first and second pieces of adhesive tapes away from one another to separate the membrane side of the multi-layer membrane/support composite from the support side of the multi-layer membrane/support composite.

22. The method as claimed in claim 21 wherein the first piece of adhesive tape has a first end and a second end and wherein the second piece of adhesive tape has a first end and a second end, wherein the first end of the first piece of adhesive tape is applied to the membrane side of the multi-layer membrane/support composite, and the second end of the first piece of adhesive tape is applied to a first rotatable winder, wherein the first end of the second piece of adhesive tape is applied to the support side of the multi-layer membrane/support composite, and the second end of the second piece of adhesive tape is applied to a second rotatable winder, and wherein said pulling is achieved by appropriately rotating said first and second rotatable winders.

23. The method as claimed in claim 21 wherein said porous support comprises a piece of fabric.

24. The method as claimed in claim 23 wherein said fabric is woven.

25. The method as claimed in claim 23 wherein said fabric is non-woven.

26. The method as claimed in claim 25 wherein said fabric is non-woven polyethylene terephthalate.

27. The method as claimed in claim 23 wherein said fabric is made from a material selected from the group consisting of polyethylene terephthalate, polypropylene, polyamide, and cellulose-based materials.

28. The method as claimed in claim 23 wherein said fabric has a thickness of about 50 to 200 μm.

29. The method as claimed in claim 28 wherein said fabric has a thickness of about 80 to 130 μm.

30. The method as claimed in claim 21 wherein said polymer solution comprises at least one polymer selected from the group consisting of a polysulfone, a polyether sulfone, a polyimide, a polyamide, a polypropylene, and a halogenated polymer.

31. The method as claimed in claim 21 wherein said porous support is a fabric support having a thickness of less than 90 μm and wherein said coated support comprises no more than ¼ the thickness of the fabric support penetrated by said polymer solution.

32. The method as claimed in claim 21 wherein said porous support is a fabric support having a thickness of at least 90 μm and wherein said coated support comprises no more than about 25-30 μm of the fabric support penetrated by said polymer solution.

33. The method as claimed in claim 21 wherein said porous support comprises a polymeric film having a plurality of openings extending in a straight fashion from a top surface of the film to a bottom surface of the film.

34. The method as claimed in claim 33 wherein said polymeric film is selected from the group consisting of a polyethylene terephthalate film, a polypropylene film, a polyethylene film, a polyamide film, an acrylic film, a polyimide film, and a polycarbonate film.

35. The method as claimed in claim 33 wherein said openings are formed by at least one of needle-punching a non-porous polymeric film, laser punching a non-porous polymeric film, and electron punching a non-porous polymeric film.

36. The method as claimed in claim 33 wherein said openings have a diameter of about 0.01 to 5 mm and are spaced apart from one another by about 0.05 to 100 mm.

37. The method as claimed in claim 36 wherein said polymeric film has a thickness of about 0.1-1.0 mm.

38. A filtration membrane made by the method of claim 33, wherein the filtration membrane has a plurality of protrusions where the polymeric solution penetrated the openings of the porous support.

39. A method of preparing a plurality of filtration membranes, said method comprising the steps of:
(a) providing a porous support;
(b) forming a filtration membrane on the porous support, whereby a membrane/support composite is formed;
(c) delaminating the membrane/support composite to provide an unsupported filtration membrane and a regenerated porous support, wherein the membrane/support composite has a membrane side and a support side and wherein said delaminating step comprises applying a first piece of adhesive tape to the membrane side of the membrane/support composite, applying a second piece of adhesive tape to the support side of the membrane/support composite, and then pulling the first and second pieces of adhesive tapes away from one another to separate the membrane side of the membrane/support composite from the support side of the membrane/support composite; and
(d) repeating steps (b) and (c) at least one time with the regenerated porous support.

40. The method as claimed in claim 39 wherein the filtration membrane is a micro filtration membrane.

41. The method as claimed in claim 39 wherein the filtration membrane is an ultrafiltration membrane.

42. The method as claimed in claim 39 wherein the filtration membrane comprises a polyamide layer over an ultrafiltration membrane.

* * * * *